United States Patent [19]

Tamura et al.

[11] Patent Number: 5,310,236
[45] Date of Patent: * May 10, 1994

[54] MOLDING MEMBER FOR AUTOMOBILE WINDOW PLATE

[75] Inventors: Tatsuya Tamura; Tetsuo Hotta, both of Yokohama, Japan

[73] Assignee: Hashimoto Forming Industry Co., Ltd., Japan

[*] Notice: The portion of the term of this patent subsequent to Apr. 14, 2009 has been disclaimed.

[21] Appl. No.: 895,231

[22] Filed: Jun. 8, 1992

Related U.S. Application Data

[63] Continuation of Ser. No. 603,551, Oct. 16, 1990, abandoned, which is a continuation-in-part of Ser. No. 423,055, Oct. 18, 1989, abandoned.

[51] Int. Cl.⁵ .............................................. B60J 10/02
[52] U.S. Cl. .................................................. 296/93
[58] Field of Search ......................................... 296/93

[56] References Cited

U.S. PATENT DOCUMENTS

| 4,678,696 | 7/1987 | Maeno et al. | |
| 4,757,659 | 7/1988 | Miyakawa et al. | 296/93 X |
| 4,757,660 | 7/1988 | Miyakawa et al. | 296/93 X |
| 4,765,673 | 8/1988 | Frabotta et al. | |
| 4,984,839 | 1/1991 | Miyakawa et al. | |
| 5,104,173 | 4/1992 | Tamura et al. | 296/93 |
| 5,114,206 | 5/1992 | Yada | 296/93 |

FOREIGN PATENT DOCUMENTS

| 310262 | 4/1989 | European Pat. Off. | 296/93 |
| 2564891 | 11/1985 | France. | |
| 2565621 | 12/1985 | France. | |
| 231814 | 10/1987 | Japan. | |
| 63-4712 | 1/1988 | Japan. | |
| 159126 | 7/1988 | Japan. | |
| 291721 | 11/1988 | Japan | 296/93 |

Primary Examiner—David M. Mitchell
Assistant Examiner—Gary C. Hoge
Attorney, Agent, or Firm—Stevens, Davis, Miller & Mosher

[57] ABSTRACT

A molding member for an automobile window plate includes an extruded elongate member with upper and side portions to continuously extend along upper and side edges of the window plate, respectively, and having a main section for covering a gap between the window plate and an adjacent automobile body panel, a lip section projecting from the main section to cover an outer periphery of the window plate, and a leg section extending from the main section into the gap for retaining the molding member in place. The lip section is provided with a first groove portion adjacent to the lip section and extending along the upper portion of the elongate member, and a second groove portion spaced from the lip section and extending along the side portion of the elongate member, to define between the lip section and the outer periphery of the window plate a weir solely along the side portion of the elongate member. The elongate member is adapted to be subjected to a permanent plastic deformation such that the first and second groove portions are aligned with each other substantially in a common plane to form a continuous single groove for receiving upper and side edges of the window plate.

11 Claims, 11 Drawing Sheets

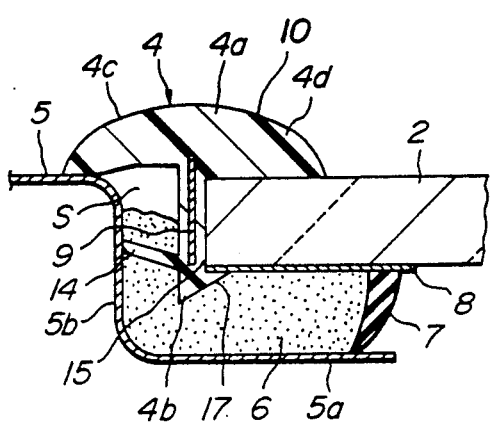
FIG_2
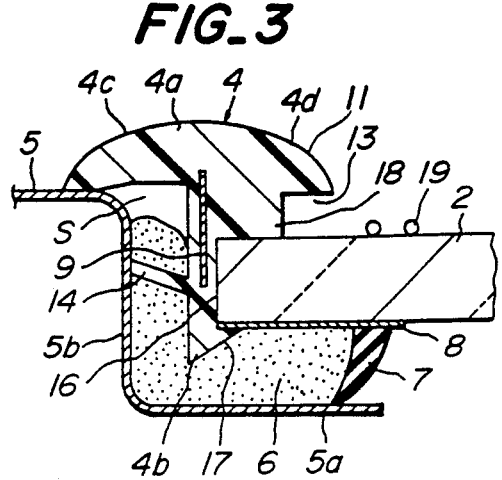
FIG_3
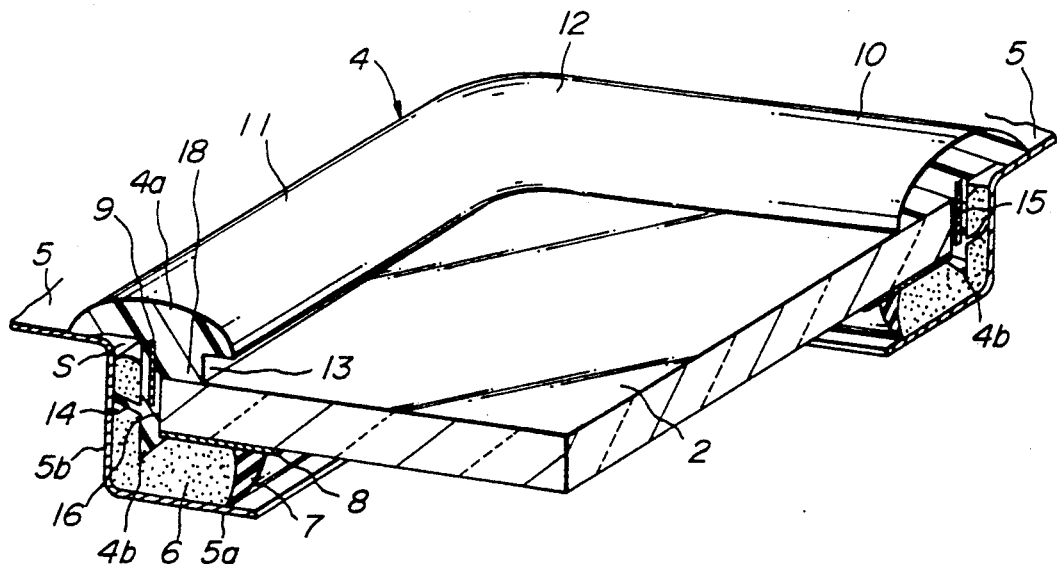
FIG_4

FIG_9
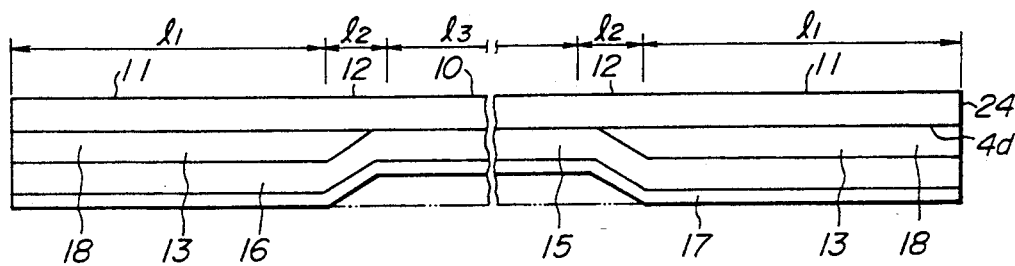
FIG_10
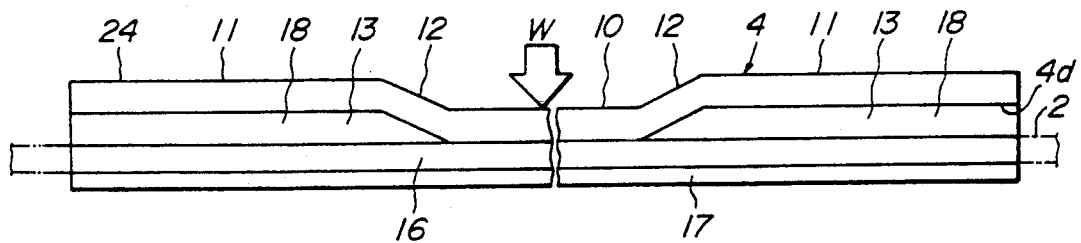

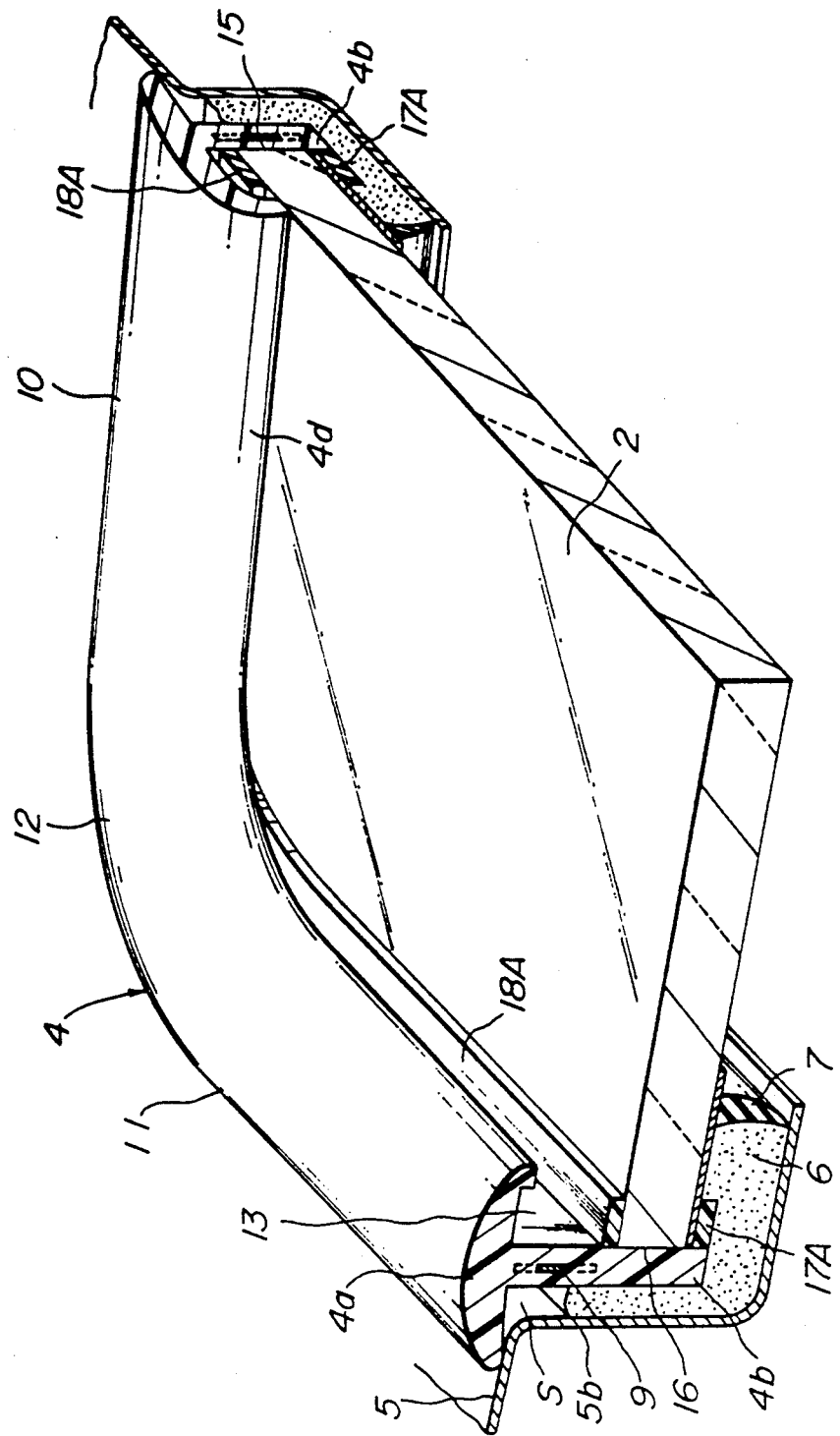

FIG_12
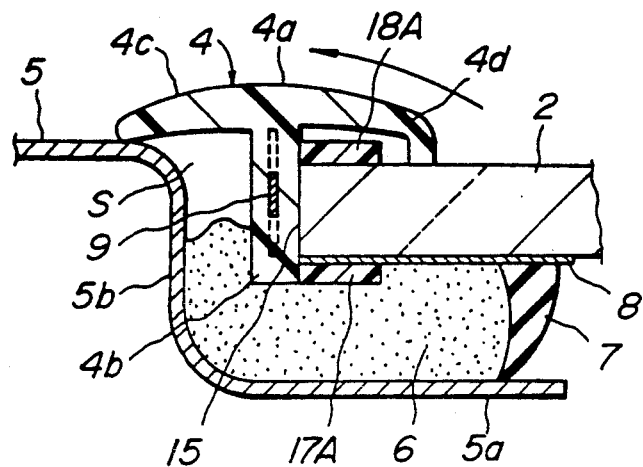
FIG_13
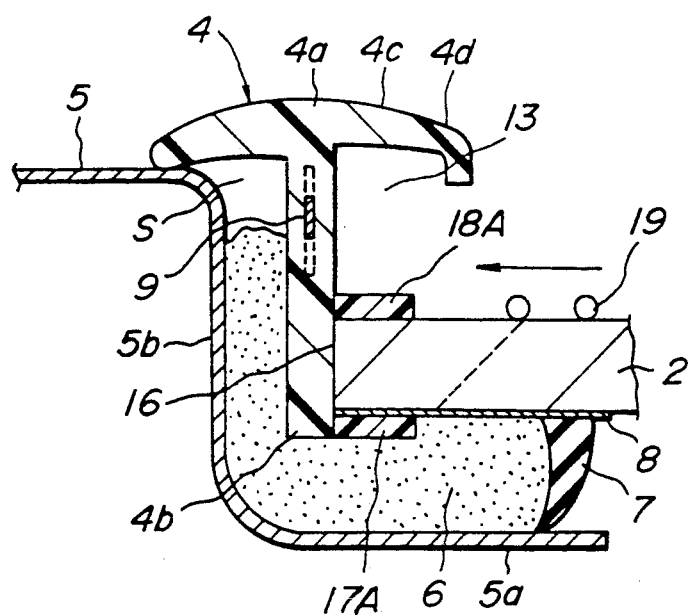

FIG_17
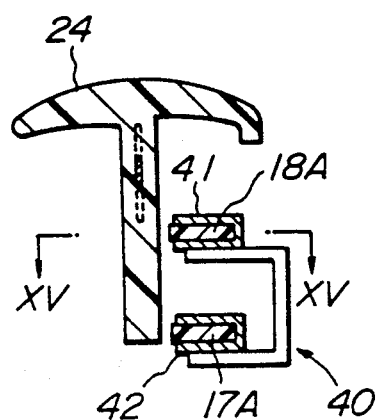
FIG_18
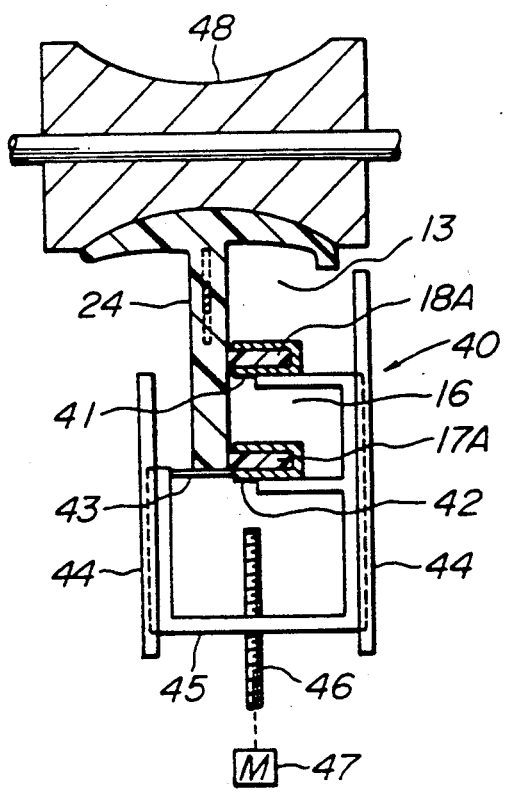

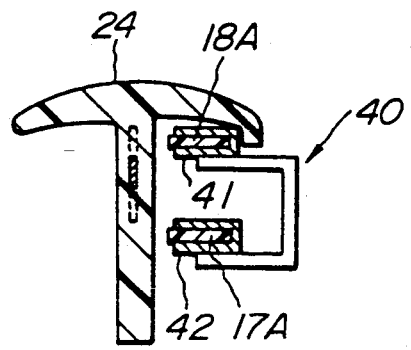
FIG_20
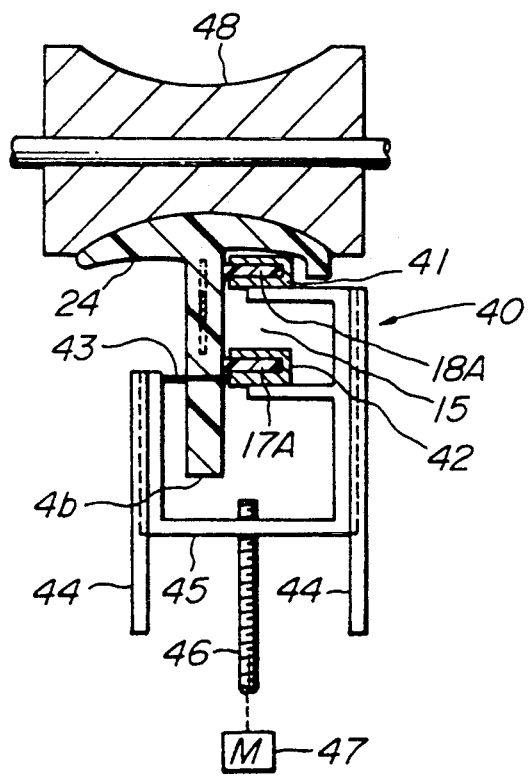
FIG_21

MOLDING MEMBER FOR AUTOMOBILE WINDOW PLATE

This application is a continuation of application Ser. No. 07/603,551, filed Oct. 16, 1990, now abandoned which is in turn a continuation in part of application Ser. No. 07/423,055, filed Oct. 18, 1989, now abandoned.

BACKGROUND OF THE INVENTION

1. Field of the Invention:

The present invention relates to a molding member for an automobile window plate, with a longitudinally variable cross-section.

2. Description of the Related Art:

An automobile generally employs various kinds of window molding members which extend along the periphery of a front or rear window plate, i.e. along a pair of front or rear pillars and the front or rear edge of the roof panel of the automobile body. A variety of requirements have been imposed on such molding members mainly from design and/or functional viewpoint, resulting in an increased demand in the automobile industry for the window molding members whose cross-sectional shape varies in the longitudinal direction.

Specifically, there has been proposed a window molding member having an upper portion of a first predetermined cross-section, a side portion of a second predetermined cross-section, and a corner portion arranged between the side and upper portions, where the cross-section changes gradually from the first to the second. When the molding member is arranged along the periphery of a front window plate, the first cross-section of the upper portion contributes to realize a so-called flush outer surface of the automobile body, while the second cross-section of the side portion serves to define a weir along the side edge of the window plate. During driving in rainy conditions, the weir serves to prevent rain water on the window plate from flowing across the side portion of the molding member toward the side window, thereby effectively preserving the driver's and/or navigator's sight through the side windows.

For producing a window molding member with longitudinally variable cross-section, various methods are known. A typical method is to physically divide each molding member into first and second extruded portions with the respectively predetermined cross-sectional shapes, which are connected with each other either by an injection molding process or by using a separate corner connection-piece. However, connection of these two portions by means of the injection molding accompanies formation of undesirable burrs along the junctions and resultant deterioration in the appearance, while use of the corner connection-piece results in increased number of the required components and assembly steps.

These problems can be more or less overcome by a method disclosed e.g. in U.S. Pat. Nos. 4,757,659 and 4,757,660 to Miyakawa et al., which includes extrusion of a continuous elongate preform body with a constant cross-section throughout the entire length. In this case, the preform body portion forming the upper portion of the molding member is subjected to cutting at the base end of a first arm section and at an area of a leg section from where a second arm section extends, to allow removal of these arm sections from the relevant body portion, and provide the upper portion with a glass plate receiving groove between the top and third arm section. On the other hand, the preform body portion forming the side portion of the molding member is subjected to cutting at the base end of the third arm section, to allow removal of that arm section from the relevant body portion, and provide the molding side portion with another glass plate receiving groove between the first and second arm sections.

Such a method is still disadvantageous in that the molding member cannot be produced accurately and efficiently, due mainly to the above-mentioned local cutting of the arm sections to form two glass plate receiving grooves along the upper and side portions of the molding member, respectively. Moreover, there are substantial difficulties in securing the molding member to the periphery of the glass plate as well, since the first arm section along the corner portion between the upper and side portions has to be formed with a receiving groove into which the glass plate must be carefully inserted, requiring delicate and time-consuming manual operations.

SUMMARY OF THE INVENTION

Therefore, it is a primary object of the present invention to provide a novel molding member for an automobile window plate, with a longitudinally variable cross-section which can be readily produced and mounted in a facilitated manner and with an improved productivity.

The present invention provides a molding member for an automobile window plate, comprising an extruded elongate member with upper and side portions to continuously extend along upper and side edges of the window plate, respectively, and having a main section for covering a gap between the window plate and an adjacent automobile body panel, a lip section projecting from the main section to cover an outer periphery of the window plate, and a leg section extending from the main section into the gap for retaining the molding member in place.

The lip section is provided with a first groove portion adjacent to the lip section and extending along the upper portion of the elongate member, and a second groove portion spaced from the lip section and extending along the side portion of the elongate member so as to define between the lip section and the outer periphery of the window plate a weir solely along the side portion of the elongate member, which serves to collect water on the window plate and guide the collected water along the weir when the molding member is in use.

According to the present invention, the elongate member, which has been extruded to have a constant cross-section throughout the entire length, is adapted to be subjected to such a permanent plastic deformation that the first and second groove portions are aligned with each other substantially in a common plane to form a continuous single groove for receiving upper and side edges of the window plate.

Thus, the window molding member according to the present invention can be produced accurately and efficiently, based on an extrusion process in combination with a permanent plastic deformation of the extruded elongate member to form a weir solely along the side portion of the elongate member, as well as a single continuous groove for receiving the edges of the window plate. This groove is formed of a first groove portion adjacent to the lip section and extending along the upper portion of the elongate member, and a second groove portion spaced from the lip section and extending along the side portion of the elongate member, which are aligned with each other substantially in a common plane as a result of the permanent plastic deformation of the extruded elongate member. Therefore, the edges of the window plate can be readily inserted into the groove of the molding member in a facilitated manner and with improved productivity, without requiring delicate and time-consuming manual operations.

In carrying out the present invention, the leg section is advantageously provided with a first retainer region along substantially the entire length of the elongate member, and further with a second retainer region along at least the side portion of the elongate member. In this instance, the arrangement may be such that the first retainer region cooperates with the lip section to define the first groove portion along the upper portion of the elongate member, and also with the second retainer region to define the second groove portion along the side portion of the elongate member, while the second retainer region cooperates with the lip section to define the weir along the side portion of the elongate member.

In one preferred embodiment of the present invention, the first retainer region includes a projection extending from the leg section toward the window plate, and the second retainer region includes a shoulder arranged solely along the side portion opposite to the projection. The shoulder along the side portion can be readily provided by locally removing a predetermined amount of material from the elongate member adjacent to the leg section, after the elongate member has been extruded from an extrusion die, in accordance with the extruded length of the elongate member.

In another preferred embodiment of the present invention, the first and second retainer regions include first and second retainer webs, respectively, both integrally provided on the leg section to project therefrom toward the window plate and extend along substantially the entire length of the elongate member. The first and second retainer webs can also be readily provided, by extruding the webs from a common extrusion die separately from the elongate member, and adhering the webs to the elongate member immediately after they have been extruded from the die, at different locations of the leg section in accordance with the extruded length of the elongate member.

BRIEF DESCRIPTION OF THE DRAWINGS

FIG. 2 is a cross-sectional view, taken along the line II—II in FIG. 1, of the upper portion of a front window molding member according to one embodiment of the present invention;

FIG. 3 is a cross-sectional view, taken along the line III—III in FIG. 1, of the side portion of the molding member of FIG. 2;

FIG. 4 is a fragmentary perspective view of the molding member of FIGS. 2 and 3;

FIG. 9 is a front view of the extruded elongate member as subjected to a permanent plastic deformation;

FIG. 10 is a fragmentary front view of the core element embedded in the elongate member;

FIG. 11 is a fragmentary perspective view, similar to FIG. 4, of the molding member according to another embodiment of the present invention;

FIG. 12 is a sectional view, similar to FIG. 2, of the upper portion of a window molding member according to another embodiment of the present invention;

FIG. 13 is a sectional view, similar to FIG. 3, of the side portion of the molding member of FIG. 11;

FIGS. 17 and 18 are sectional views of the shaping device, taken along the lines XVII—XVII and XVIII—XVIII in FIG. 16, respectively;

FIGS. 20 and 21 are sectional views of the shaping device, taken along the lines XX—XX and XXI—XXI in FIG. 19.

DETAILED EXPLANATION OF THE PREFERRED EMBODIMENTS

The present invention will now be explained in further detail, by referring to some preferred embodiments shown in the attached drawings.

Figure 1:
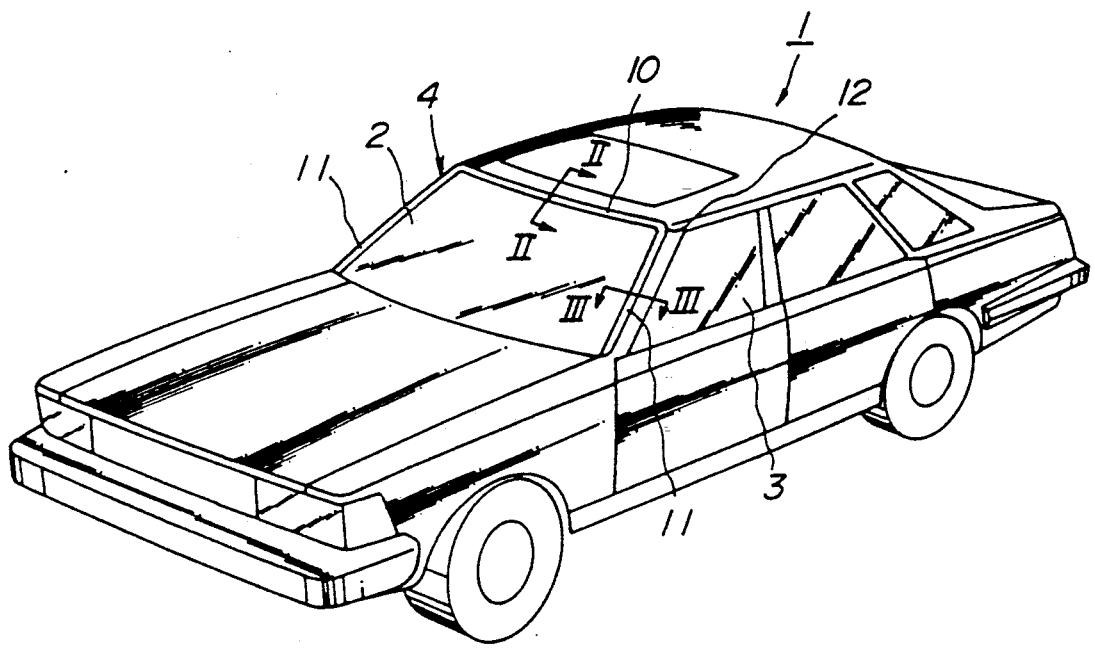
FIG. 1 is a perspective view of an automobile with window molding members to which the present invention may be applied.

There is shown in FIG. 1 an automobile which is designated as a whole by reference numeral 1, and which includes a front window plate 2 and side window plates 3. The front window plate 2 may be composed of a transparent inorganic glass or transparent synthetic resin, such as polycarbonate resin, acrylic resin or the like, and is associated with a window molding member 4 to which the present invention is applied.

As particularly shown in FIGS. 2 to 4, the window molding member 4 is arranged to cover a gap or space S between the automobile body panel 5 and the peripheral edge of the front window plate 2. The front window plate 2 is secured to a depressed flange or seat portion 5a of the body panel 5 by means of an adhesive material 6, with a rubber dam member 7 arranged between the window plate 2 and the seat portion 5a of the body panel 5. The window plate 2 may be provided on its rear surface with an opaque printed layer 8 which extends along the periphery of the plate 2 such that the adhesive material 6 and the dam member 7 are not visible from outside, to realize a refined appearance.

The molding member 4 is formed of an elongate member composed of a flexible and/or soft polyvinylchloride (PVC) resin, ionomer resin, ethylenevinyl acetate copolymer (EVA) resin, cellulose acetate butylate (CAB) resin, appropriate synthetic rubber material or other suitable thermoplastic and elastomeric synthetic resin material with a flexibility. As will be explained hereinafter, the material forming the molding member 4 is co-extruded with an appropriate core element 9 and optionally with an ornamental film (not shown), into an elongate member of a substantially constant cross-section throughout the entire length. The core element 9 is embedded into the material of the elongate member while the ornamental film, if present, may have an outer surface with a metallic luster or desired color so as to be partly exposed outside.

The molding member 4 in its longitudinal direction includes an upper portion 10 (FIG. 4) along the upper edge of the window plate 2, a pair of side portions 11 (FIG. 4) along the side edges of the window plate 2, and a pair of transient portions 12 (FIG. 4) where the cross-section of the upper portion 10 gradually changes to that of the side portion 11.

Furthermore, the molding member 4 in its cross-section includes a main section 4a, a leg section 4b projecting from the main section 4a to extend into the space S between the automobile body panel 5 and the edge of the front window plate 2, as well as a pair of lip sections 4c, 4d formed on, and projecting from both sides of the main section 4a. The lip sections 4c, 4d are each in the form of a ridge which extends along the entire length of the extruded elongate member. The lip section 4c has a free end bearing against the outer surface of the automobile body panel 5 in the upper and side portions 10, 11 of the molding member 4 (FIGS. 2 and 3). On the other hand, the lip section 4d bears against the outer surface of the window plate 2 in the upper portion 5 (FIG. 3), but is spaced therefrom by a predetermined distance in the side portions 11 of the molding member 4 so as to define a channel 13 (FIG. 4) which will be explained hereinafter.

The leg section 4b of the molding member 4 has at least one fin 14 formed on that side which is remote from the window plate 2. The fin 14 is engageable with a shoulder portion 5b of the body panel 5 adjacent to the seat portion 5a. If necessary, the shoulder portion may be provided with at least one fin which corresponds to the fin 14 of the leg section 4b.

The molding member 4 is formed with a groove for receiving upper and side edges of the window plate 2, which includes an upper groove portion 15 and side groove portions 16 extending along the upper and side portions 10, 11 of the molding member 4, respectively. To this end, the leg section 4b has a free end extending along the entire length of the molding member 4, which is in the form of a retaining projection 17 engageable with the edge of the window plate 2 on its rear side. Furthermore, along the side portion 11 of the molding member 4, the leg section 4b has a retaining shoulder 18 which, in turn, is engageable with the edge of the window plate 2 on its front side.

Thus, the upper groove portion 15 is defined by and between the lip section 4d and the projection 17, i.e. the free end of the leg section 4b, while each side groove portion 16 is defined by and between the shoulder 18 and the projection 17. The above-mentioned channel 13 extends solely along the side portions 10 of the molding member 4, and is defined by and between the lip section 4d and the shoulder 18 of the molding member 4 and the outer surface of the window plate 2. With the molding member 4 in use, particularly during driving in rainy conditions, the channel 13 serves to collect and guide rain water 19 on the window plate 2 to prevent the rain water 19 from flowing across the side portions 11 of the molding member 4, thereby effectively preserving the driver's or navigator's sight through the side window plates 3. In other words, the shoulder 18 extends along the side portion 11 of the molding member 4, is arranged in between the lip section 4d and the front window plate 2, and functions as a weir which cooperates with the lip section 4d and the front window plate 2 to define the channel 13.

Moreover, according to the present invention, the elongate member forming the molding member 4 is pre-subjected to a permanent plastic deformation such that the upper and side groove portions 15, 16 are aligned with each other substantially in a common plane to form a single groove for receiving the edges of the window plate 2. Provision of a single groove, formed of the upper and side groove portions 15, 16 which are aligned with each other substantially in a common plane, permits a facilitated insertion of the edge of the window plate 2 into the groove and serves to significantly improve the assembling efficiency.

The window molding member 4 according to the above-mentioned embodiment can be accurately and efficiently produced by a production line to be fully described hereinafter.

Figure 5:
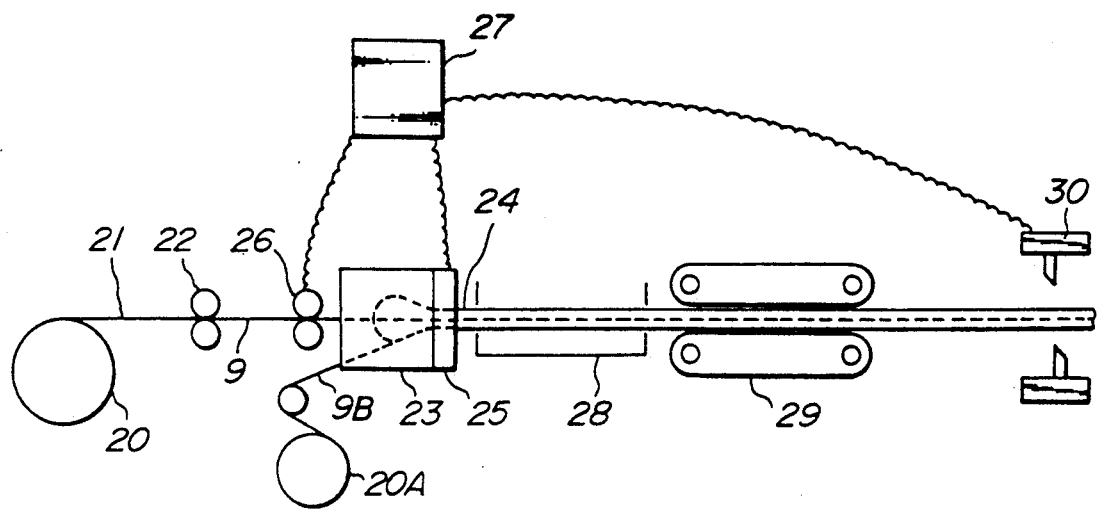
FIG. 5 is a system diagram of one example of the production line which is adapted to produce the window molding member of the present invention.
Figure 6:
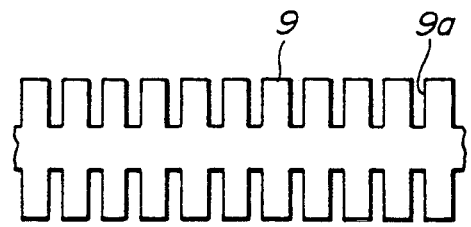
FIG. 6 is a side view of the core element included in the production line of FIG. 5.

There is shown in FIG. 5 a system diagram of the production line which includes a first uncoiler 20 for continuously supplying a strip material 21 to a punch-press station 22, where it is shaped into the desired configuration of the core element 9. The strip material 21 may be composed of an appropriate metal with a low susceptibility to rust, such as aluminum or stainless steel resin sheet, which can be readily subjected to bending and/or permanent plastic deformation. To this end, as shown in FIG. 6, the core element 9 may be shaped into a herringbone-like configuration, with a plurality of slits 9a for facilitating bending of the core element 9 about axes which are perpendicular to its longitudinal axis. Preferably, the strip material 21 is previously applied with an adhesive agent.

Instead of supplying a strip material 21 from the uncoiler 20 and subsequently shaping it into the desired configuration of the core element 9, the uncoiler 20 may supply a strip material which has been pre-shaped into the desired configuration. Furthermore, the core element 9 of the above-mentioned specific configuration may be replaced by one or more strands of glass- or carbon-fibers or polyester fibers, which are embedded in the main section 4a and/or in the leg section 4b of the molding member 4.

The illustrated production line further includes an optional second uncoiler 20A for the continuous supply of the ornamental film 9B. Preferably, the ornamental film 9B is previously applied with an adhesive agent, like the strip material 21 forming the core element 9. The core element 9 and the ornamental film 9B are supplied to an extruder 23, and co-extruded together with a thermoplastic resin material, such as PVC, into a continuous rod 24 of a substantially constant cross-section throughout the entire length, including sections which correspond to the above-mentioned various sections of the molding member 4.

In order to realize the variable cross-section for the upper and side portions 10, 11 of the molding member 4 based on the extruded rod 24 of substantially constant cross section, a cutting device 25 is arranged in the vicinity of the extruder 23 to subject the extruded rod 24 to a controlled cutting and removal of material. More particularly, immediately after the rod 24 has been extruded, i.e. while it is still hot and soft, the rod 24 is subjected to cutting and removal of predetermined amount of material from a region adjacent to the section of the rod 24 which corresponds to the leg section 4b of the molding member 4. The controlled cutting and removal of material by the cutting device 25 is carried out in accordance with the supplied length of the core element 9. To this end, a rotary encoder or the like detector 26 is arranged between the punch-press station 22 and the extruder 23, for detecting the length of the core element 9 supplied to the extruder 23. The detector 26 is connected to an appropriate controller 27 which serves to control the operation of the cutting device 25 to carry out the controlled cutting and removal of material from the extruded rod 24.

The extruded continuous rod 24 to which the controlled cutting and removal of material has been carried out by the cutting device 25 is subsequently supplied to a sizing/cooling device 28, and is subjected to a required sizing and to a simultaneous cooling while being drawn by an appropriate hauling device 29. The continuous rod 24 is further supplied to another cutting device 30, where it is successively cut into elongate members of a predetermined length corresponding to each molding member 4. The operation of the cutting device 30 is also controlled by the controller 27 in accordance with the supplied length of the core element 9.

Figure 7:
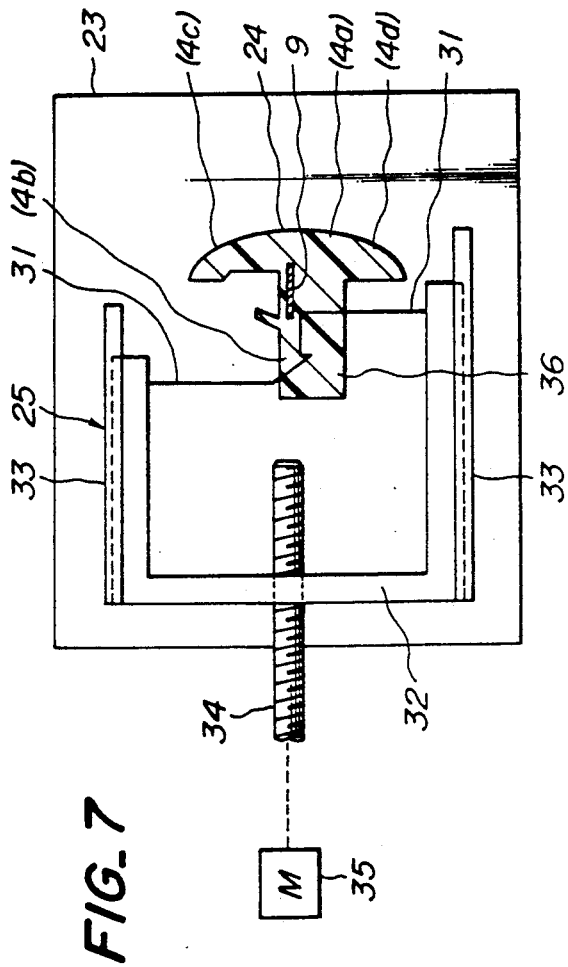
FIG. 7 is a front view of the extruded elongate member as subjected to cutting and removal of material.

The cutting device 25 for the controlled cutting and removal of material from the extruded rod 24 includes a cutter element 31 (see FIG. 7) in the form of a metal blade, which is mounted on and supported by a movable frame 32 and adapted to be maintained in engagement with the extruded continuous rod 24 at its section corresponding to the leg section 4b of the molding member 4. The frame 32 is slidably guided by guide members 33, and engaged by a threaded rod 34 which is connected to a reversible servomotor 35. The servomotor 35 is connected to, and controlled by the controller 27 in accordance with the supplied length of the core element 9. Operation of the servomotor 35 results in rotation of the threaded rod 34 either in normal or reverse direction, causing the cutter element 31 to move either forwardly or backwardly in the longitudinal direction of the rod 34.

Figure 8:
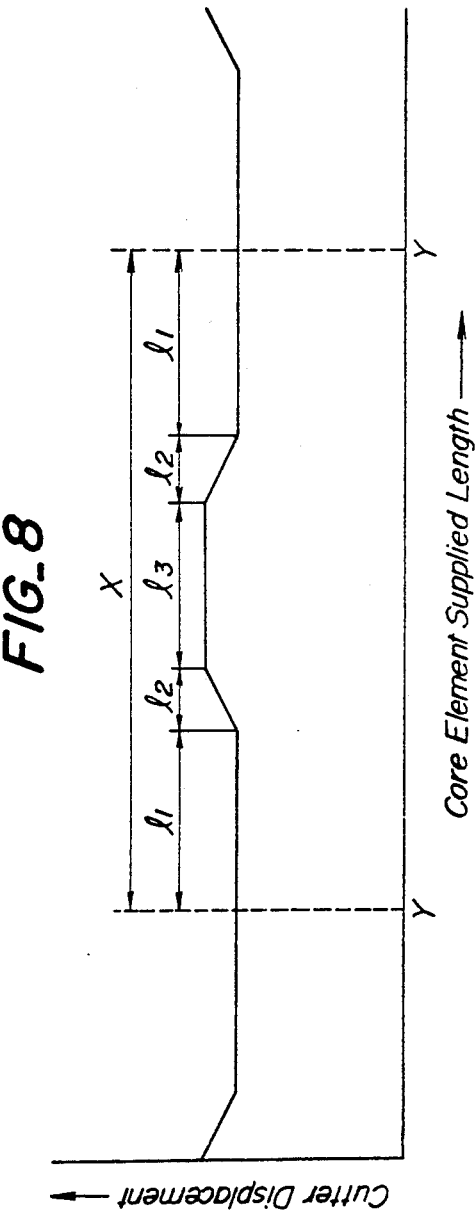
FIG. 8 is a diagram showing the relationship between the supplied extruded length of the elongate member and the displacement of the cutter element.
Figure 14:
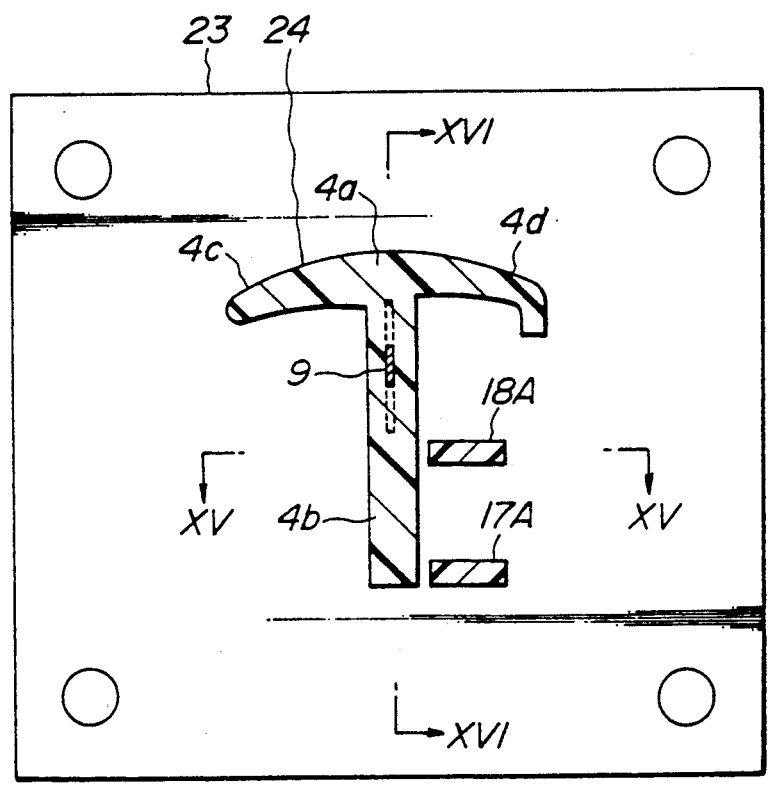
FIGS. 14 is a side view of the extruder included in the production line similar to that shown in FIG. 5.
Figure 15:
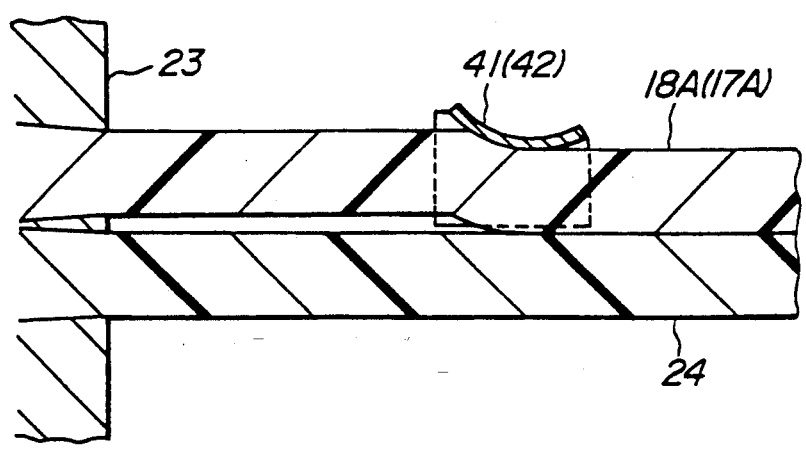
FIGS. 15 and 16 are sectional views of the shaping device arranged adjacent to the extruder of FIG. 14, taken along the lines XV—XV and XVI—XVI in FIG. 14, respectively.
Figure 16:
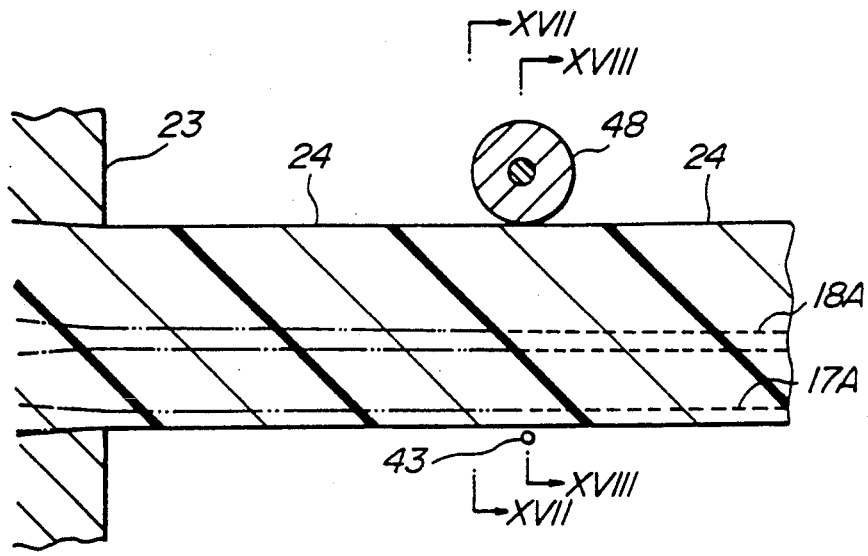

The relationship between the supplied length of the core element 9 and the displacement of the cutter element 31 is shown in FIG. 8, and will be explained below. That is, as the continuous rod 24 is extruded from the extruder 23 with the cutter element 31 maintained in its one extreme position, i.e. the retracted position shown in FIG. 7, material 36 of the extruded rod 24 adjacent to its section corresponding to the leg section 4b of the molding member 4 is cut and removed by the cutter element 31 to form a preform portion for the side portion 11 of the molding member 4 including the shoulder 18 for defining the channel 13 and the side groove portion 16.

As the detector 26 detects completion of the supply of the length $l_1$ of the core element 9, which corresponds to the length of the side portion 11 of the molding member 4, the servomotor 35 is actuated to drive the threaded rod 34 in normal direction by a predetermined amount, thereby to advance the cutter element 31 further into the extruded rod 24. This results in removal of the extruded material 36 by gradually increased amount of formation of the shoulder 18 of gradually decreased thickness or height, and hence in formation of the corner portion 12 of the molding member 4.

When the detector 26 detects that the supply of the length $l_2$ of the core element 9 has been completed, which corresponds to the length of the corner portion 12, the servomotor 35 is stopped to maintain the cutter element 31 in its another extreme position, i.e. the maximum extended position. This results in removal of the extruded material 36 by a maximum amount, and hence in formation of the upper portion 10 of the molding member 4 without the shoulder 18. As the detector 26 further detects completion of the supply of the length $l_3$ of the core element 9, which corresponds to the length of the upper element 10, the servomotor 35 is driven in reverse direction to retract the cutter element 31 into its initial position shown in FIG. 7, to form another corner portion 12 and another side portion 11.

By actuating the servomotor 35 to selectively extend or retract the cutter element 31 in the manner described above, the extruded continuous rod 24 is successively shaped into a preform of elongate member for the molding member 4 as shown in FIG. 9, in which the upper and side groove portions 15, 16 are offset from each other.

As mentioned above, the extruded continuous rod 24 subjected to the above-mentioned controlled cutting and removal of material is cut by the cutting device 30 into the length of elongate member for the molding member 4. In this connection, reference character X in FIG. 8 denotes the length of one molding member 4 ($=2l_1+2l_2+l_3$), and Y the location where the extruded continuous rod 24 is to be cut. The material 36 removed from the rod 24 may be recovered and used again.

Thereafter, as shown in FIG. 10, the extruded rod 24 cut into the elongate member for the molding member 4 is applied with a force W in a direction which extends downwardly of the molding member 4 to subject the elongate member to a permanent plastic deformation near the corner portions 12 so as to form a molding member 4 in which the upper and side groove portions 15, 16 are aligned with each other substantially in a common plane, forming the above-mentioned single continuous groove of a straight configuration which is adapted to readily receive the edge of the window plate 2.

The permanent plastic deformation of the extruded rod 24 may be realized by plastic deformation of the core element 9 solely as a result of application of a mechanical force by means of a press machine or the like, though it is further advantageous to simultaneously heat the rod 24 by making use of a hot press or the like, for assisting plastic deformation of the resin forming the molding member 4. Furthermore, instead of plastically deforming the extruded rod 24 cut into length of the molding member 4, on the downstream side of the cutting device 30, the extruded rod 24 may be subjected to the plastic deformation in its continuous state, at a station between the two cutting devices 25, 30.

Also, the plastic deformation for aligning the upper and side groove portions 15, 16 may be carried out when mounting the molding member 4 in place.

Another embodiment of the present invention will be explained below with reference to FIGS. 11–21, wherein the same reference numerals denote the same or equivalent elements for the sake of simplicity. The present embodiment differs slightly from the previous one in that, instead of the projection 17 and the shoulder 18 as particularly shown in FIG. 3, the leg section 4b of the molding member 4 is integrally provided with a pair of retainer webs 17A, 18A. Thus, as in the above-mentioned embodiment, the upper groove portion 15 is defined by and between the lip section 4d and the web 17A, while each side groove portion 16 is defined by and between the webs 17A, 18A. Furthermore, the channel 13 extends solely along the side portions 10 of the molding member 4, and is defined by and between the lip section 4d and the web 18A of the molding member 4 and the outer surface of the window plate 2. The molding member 4 of this embodiment achieves substantially the same functional advantages as the previous one.

The production line which serves to produce the molding member 4 of FIGS. 11–13 is basically the same as that shown in FIG. 5, except for the following points. That is, the production line includes a slightly modified extruder 23A with a main orifice for extruding a continuous rod 24 with sections which correspond to main section 4a, leg section 4b and lip sections 4c, 4d of the molding member 4, as well as additional orifices for extruding continuous webs 17A, 18A separately from the continuous rod 24. The production line further includes a shaping device 40 (FIG. 17) adjacent to and on the downstream side of the extruder 23A, whose arrangement and functions are explained hereinafter.

The shaping device 40 includes guide pieces 41, 42 for urging the continuous webs 18A, 17A against that region of the continuous rod 24 which corresponds to the side surface of the leg section 4b, in order to bring them into adhesion with each other. The shaping device 40 further includes a cutter element 43 in the form of a tensioned metal wire. The cutter element 43 is adapted to cut and remove a predetermined amount of material from the continuous rod 24 adjacent to its region which corresponds to the leg section 4b of the molding member 4. Thus, the cutter element 43 serves to maintain the minimum required length of the leg section 4b. The guide pieces 41, 42 and the cutter element 43 are slidably guided by guide members 44, as being mounted on a frame 45 which is engaged by a threaded rod 46 connected to a reversible servomotor 47. This servomotor 47 is connected to and controlled by a controller 27 (FIG. 5). The shaping device 40 further includes a backup roller 48 above the cutter element 43, which serves to support the continuous rod during cutting and removal of material by the cutter element 43.

The operation of the shaping device 40 is as follows. That is, as the continuous rod 24 and the webs 17, 18 are separately extruded from the respective orifices of the extruder 23, with the guide pieces 41, 42 and the cutter element 43 in their respective extreme positions, i.e. the retracted position shown in FIGS. 16–18, material of the extruded rod 24 adjacent to its section corresponding to the leg section 4b of the molding member 4 is cut and removed by the cutter element 43. At the same time, the guide pieces 41, 42 cause the webs 18A, 17A to be respectively urged against and adhered to predetermined lower locations of the section of the rod 24 corresponding to the leg section 4b of the molding member 4. This results in formation of a preform portion for the side portion 11 of the molding member 4, wherein the channel 13 is defined by and between the lip section 4d and the upper web 18A.

As explained with reference to the previous embodiment, when the detector 26 detects completion of the supply of the length $l_1$ of the core element 9, which corresponds to the length of the side portion 11 of the molding member 4, the servomotor 47 is actuated to drive the threaded rod 46 in the normal direction by a predetermined amount, thereby to gradually advance the cutter element 43 further into the extruded rod 24 and displace the guide pieces 41, 42 upwardly in FIGS. 17 and 18. This results in adhesion of the webs 17A, 18A to the respective higher locations of the section of the continuous rod 24 for the leg section 4b of the molding member 4, and hence in formation of a preform portion for the corner portion 12 of the molding member 4.

Figure 19:
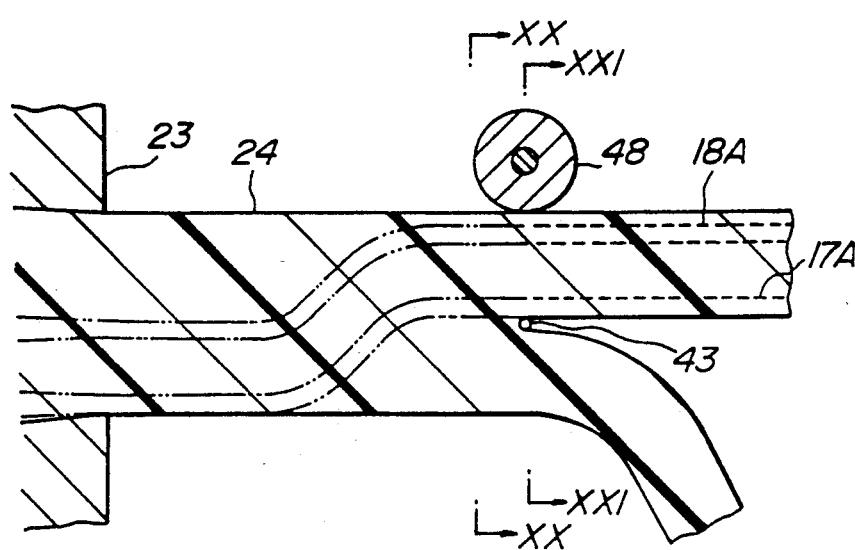
FIG. 19 is a sectional view of the shaping device, similar to FIG. 16 but showing another operational mode.

When the detector 26 further detects that the supply of the length $l_2$ of the core element 9 has been completed, which corresponds to the length of the corner portion 12, the servomotor 47 is stopped to maintain the cutter element 43 in its another extreme position, i.e. the maximum extended position as shown in FIGS. 19–21. This results in removal of the extruded material by a maximum amount, and adhesion of the webs 17A, 18A to their respective highest locations of the section of the continuous rod 24 for the leg section 4b of the molding member 4, and hence in formation of a preform portion for the upper portion 10 of the molding member 4 wherein the channel 13 is defined by and between the lip section 4d and the lower web 17A, and the upper web 18A is accommodated behind the lip section 4d. As the detector 26 further detects completion of the supply of the length $l_3$ of the core element 9, which corresponds to the length of the upper element 10, the servomotor 47 is driven in reverse direction to retract the guide pieces 41, 42 and the cutter element 43 into their initial positions, shown in FIGS. 17, 18, to form preform portions for another corner portion 12 and another side portion 11.

By actuating the servomotor 47 to selectively extend or retract the guide pieces 41, 42 and the cutter element 31 in the manner described above, the extruded continuous rod 24 is successively shaped into a preform of the elongate member for the molding member 4, in which the upper and side groove portions 15, 16 are offset from each other.

Hereafter, as explained with reference to FIG. 10, the extruded rod 24 cut into the elongate member for the molding member 4 is applied with a force in a direction which extends downwardly of the molding member 4 to subject the elongate member to a permanent plastic deformation near the corner portions 12 so as to form a molding member 4 in which the upper and side groove portions 15, 16 are aligned with each other substantially in a common plane, forming a single continuous groove of a straight configuration which is adapted to readily receive the edge of the window plate 2.

It will be readily appreciated from the foregoing detailed description that the present invention provides a novel molding member for an automobile window plate, with a longitudinally variable cross-section which can be readily produced and mounted in a facilitated manner and with an improved productivity.

It is to be recognized, of course, that the present invention is not limited to the above mentioned specific embodiments, which were given by way of examples only, and various modifications/alterations may be made without departing from the scope of the invention. For example, in producing the molding members according to the present invention, the production line may be controlled in accordance with the supplied length of ornamental film 9B or the extruded length of the continuous rod 24, instead of the supplied length of the core element 9. Furthermore, depending upon the cross section configuration of the automobile body panel 5 to which the molding member 4 is secured, it is not always necessary to remove material from that section of the extruded rod 24 which corresponds to the leg section 4b, and this is particularly the case where the depth of the shoulder portion 5b of the body panel 5 has substantially the same depth along the upper and side portions 10, 11 of the molding member 4.

What is claimed is:

1. A window molding member for automobiles having a body panel with an outer surface, a flange which is recessed from said outer surface, and a shoulder portion connecting said flange with said outer surface, a window plate mounted on said flange of the body panel, said window plate having an inner surface, an outer surface, a central region and a peripheral edge opposing said shoulder portion of the body panel so as to form a gap therebetween, said window molding member comprising:

an upper segment to extend along an upper edge of the window plate, a side segment to extend along a side edge of the window plate, and a corner segment to extend along a corner edge of the window plate and integrally and continuously connecting said upper and side segments with each other in a longitudinal direction of said window molding member, each segment comprising:

a main body covering the peripheral edge of the window plate from outside, said main body comprising first and second sections on each side of said main body, said first section being on the side of said outer surface of said body panel and said second section projecting over the peripheral edge of the window plate and toward its central region; and a leg section which is integral with said main body, and projects from an inner side of said main body to extend into said gap, said leg section having means for defining a groove-like retainer on one side of said leg section, said retainer being engageable with said peripheral edge of the window plate, said retainer extending in the longitudinal direction of the window molding member, said retainer having an inner projecting means which is spaced by a first predetermined vertical distance from a peripheral edge of the second section closest to said central region of said window plate along the upper segment of the window molding member and which is spaced by a second predetermined vertical distance from said peripheral edge of the second section along the side segment of the window molding member, said second predetermined vertical distance being greater than said first predetermined vertical distance, the arrangement being such that the peripheral edge of said second section of the main body for the upper segment substantially contacts the outer surface of the window plate, and the peripheral edge of said second section of the main body for the side segment defines a channel-like weir between the second section and the outer surface of the window plate, the flange of the body panel being at a third predetermined distance from the outer surface of the body panel at a first region which corresponds to the upper segment of the window molding member; the flange being at a fourth predetermined distance from the outer surface of the body panel at a second region which corresponds to the side segment of the window molding member; said fourth predetermined distance being greater than the third predetermined distance, and the second predetermined vertical distance along the side segment being greater than the first predetermined vertical distance by an amount which is substantially the same as the difference between the third and fourth predetermined distances.

2. The window molding member as claimed in claim 1, wherein said inner projection of the retainer of the leg section is spaced from the second section of the main body by a fifth predetermined distance which gradually changes from said first predetermined distance to said second predetermined distance in a region of the window molding member between said upper and side segments.

3. The window molding member as claimed in claim 1, wherein said leg section extends beyond the inner surface of the window plate and terminates at a free end.

4. The window molding member as claimed in claim 3, wherein said free end of the leg section has means that is engageable with the inner surface of the window plate at the peripheral edge thereof.

5. The window molding member as claimed in claim 1, wherein said leg section has a free end which is spaced by a fifth predetermined distance from the second section of the main body along the upper segment of the window molding member and spaced by a sixth predetermined distance from the second section of the main body along the side segment of the window molding member, said sixth predetermined distance being greater than said fifth predetermined distance.

6. The window molding member as claimed in claim 1, wherein said window plate has a thickness, defined by said outer and inner surfaces of the window plate, said means for defining a groove-like retainer comprising first and second webs formed on said one side of the leg section and spaced from each other by a fifth predetermined distance corresponding to the thickness of said window plate, said first and second webs engaging with said outer and inner surfaces of the window plate, respectively.

7. The window molding member as claimed in claim 1, wherein said leg section comprises a fin which is engageable with said shoulder portion of said body panel.

8. The window molding member as claimed in claim 7, wherein said fin is positioned to be opposed to said shoulder portion.

9. The window molding member as claimed in claim 1, wherein said leg section comprises a core element which is embedded in said leg section.

10. The window molding member as claimed in claim 1, wherein said first section of the main body comprises a lip for covering said gap between said peripheral edge of the window plate and said shoulder portion of the body panel.

11. The window molding member as claimed in claim 1, wherein said first section of the main body comprises a lip which is to be brought into contact with said outer surface of the body panel.

* * * * *